(12) United States Patent
Derr

(10) Patent No.: US 6,298,960 B1
(45) Date of Patent: Oct. 9, 2001

(54) SMALL VISCOUS PRECISION DAMPER

(75) Inventor: Calvin Derr, Chicago, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/580,859

(22) Filed: May 30, 2000

(51) Int. Cl.[7] .................. F16F 9/12; F16D 57/00
(52) U.S. Cl. .................. 188/290; 188/322.5
(58) Field of Search .................. 188/290, 292, 188/291, 322.5, 130; 16/51, 53, 54, 82, DIG. 10, DIG. 9; 74/574, 572, 573 F; 4/236; 192/58.4

(56) References Cited

U.S. PATENT DOCUMENTS

| | | | |
|---|---|---|---|
| 4,527,675 | * | 7/1985 | Omata et al. .................. 188/290 |
| 4,571,773 | * | 2/1986 | Yuda .................. 188/290 |
| 4,614,004 | | 9/1986 | Oshida . |
| 4,638,528 | * | 1/1987 | Omata et al. . |
| 4,691,811 | * | 9/1987 | Arakawa et al. .................. 188/290 |
| 4,701,229 | * | 10/1987 | Arakawa et al. . |
| 4,796,733 | * | 1/1989 | Nakayama .................. 188/290 |
| 4,830,151 | * | 5/1989 | Numata .................. 188/290 |
| 4,833,938 | * | 5/1989 | Reinwall et al. .................. 74/574 |
| 4,840,083 | * | 6/1989 | Hagan et al. .................. 74/574 |
| 4,869,125 | * | 9/1989 | Saigura .................. 188/290 |
| 4,893,522 | * | 1/1990 | Arakawa .................. 188/290 |
| 5,211,267 | * | 5/1993 | Clark .................. 188/290 |
| 5,269,397 | * | 12/1993 | Kawamoto et al. .................. 188/290 |
| 5,301,775 | * | 4/1994 | Nedbal et al. .................. 188/290 |
| 5,718,309 | * | 2/1998 | Kariya .................. 188/290 |

* cited by examiner

Primary Examiner—Douglas C. Butler
(74) Attorney, Agent, or Firm—Pitney, Hardin, Kipp & Szuch LLP

(57) ABSTRACT

The viscous damper is formed with a body with a cylindrical wall presenting an edge with a circular tongue element thereon. A cap with a corresponding circular groove element is placed thereon so that the tongue and groove elements align with each other. The resulting tongue and groove configuration is ultrasonically welded thereby forming a hermetic seal. This particularly results in a very precise damper height which is important for small or miniature dampers.

11 Claims, 3 Drawing Sheets

SMALL VISCOUS PRECISION DAMPER

BACKGROUND OF THE INVENTION

1. Field of the Invention

The present invention relates to a small viscous precision damper wherein the cap is attached by a tongue and groove joint which is ultrasonically welded.

2. Description of the Prior Art

Viscous dampers are known in the prior art. However, typically the cap includes a cylindrical rim which is inserted over the body of the damper and fastened thereto so as to create a shear connection between the cap and the body. However, such a design, particularly as smaller and smaller dampers are desired to be manufactured, can result in degraded repeatability in manufacturing, sealing and torque aspects. More specifically, some prior art damper designs result in both weld and torque variations due to the outward pressure applied to the cap during welding. This outward pressure decreases the weld penetration and varies the overall height of the damper which creates variations in the damper torque and may further result in silicone leakage. Similarly, some prior art damper designs have decreased weld encapsulation which decreases weld strength and sealing and creates undesired minute strings of plastic which affect customer applications.

An example of a prior art damper using a snap-together design is disclosed in U.S. Pat. No. 4,614,004 entitled "Oil Filled Rotary Damper Having a Symmetrically Shaped Flexible Membrane" issued on Sep. 30, 1986 to Oshida.

OBJECTS AND SUMMARY OF THE INVENTION

It is therefore an object of the present invention to provide a damper design, particularly an improved seal therefor, for applications requiring a reduced size of damper.

It is therefore a further object of the present invention to provide a damper design with increased repeatability with respect to manufacturing, sealing and torque.

It is therefore a still further object of the present invention to provide a damper design which minimizes weld and torque variation resulting from outward pressure applied to the cap.

It is therefore a still further object of the present invention to provide a damper design which provides sufficient weld penetration.

It is therefore a still further object of the present invention to provide a damper design which provides a uniform damper height.

It is therefore a final object of the present invention to provide a damper design with sufficient weld encapsulation and minimization or reduction of undesired minute strings of plastic.

These and other objects are attained by providing a small or miniature rotary damper typically including a cap, rotor, O-ring, optional gear, viscous fluid (or other damping media) and a housing. The cap and the housing include a tongue and groove joint specifically adapted to ultrasonic welding. As the cap is generally disk-shaped and placed directly on the edge of the housing and ultrasonically welded thereto, the damper height can be precisely maintained.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
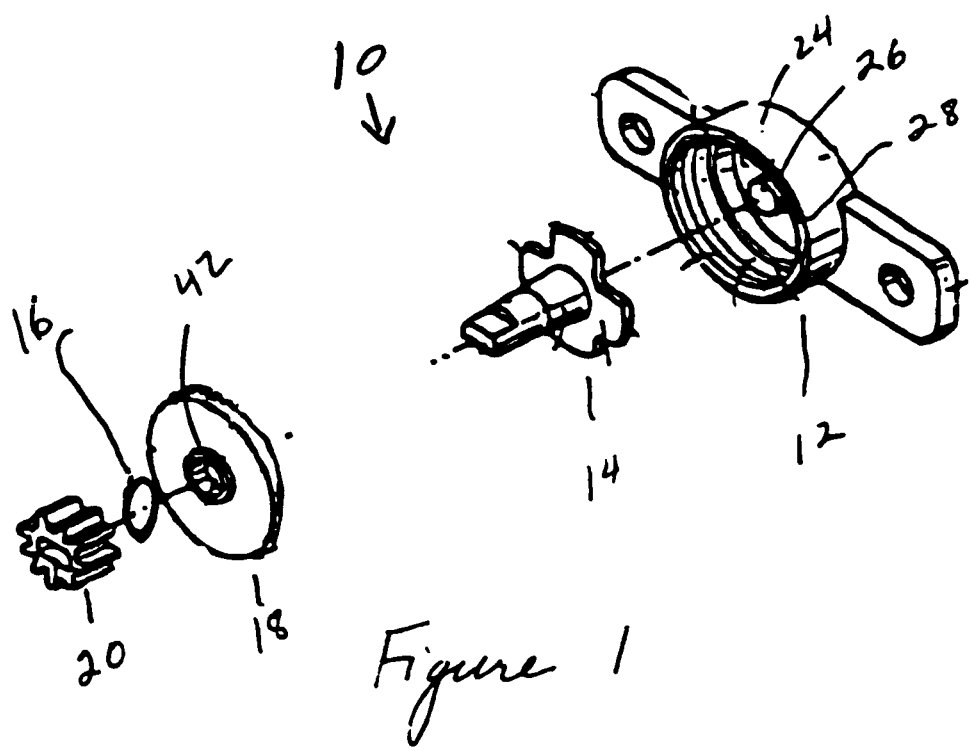
FIG. 1 in exploded perspective view of a typical damper of present invention.
Figure 3:
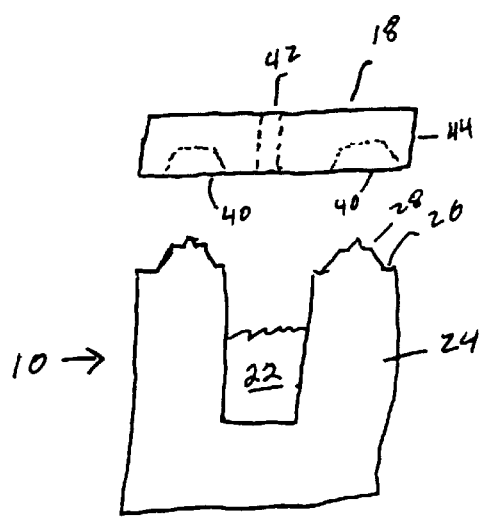
FIG. 3 is an exploded cross-sectional view of the body and cap prior to ultrasonic welding.

Referring now to the drawings in detail wherein like numerals refer to like elements throughout the several views, one sees that FIG. 1 is an exploded view of a typical damper 10 of the present invention. The damper 10 includes base 12, rotor 14, O-ring 16, cap 18, and gear 20. Additionally, base 12 is filled with viscous fluid or damping media 22 (see FIG. 3), such as silicone, in which rotor 14 rotates during operation. The basic operation of this damper 10 can be found in U.S. Pat. No. 4,614,004 entitled "Oil Filled Rotary Damper Having Symmetrically Shaped Flexible Membrane", the contents of which are hereby incorporated by reference. However, many variations within the design, particularly that of the configuration of rotor 14, O-ring 16 and gear 20 are envisioned to be within the scope of this invention. Furthermore, gear 20 should be considered to be optional, depending upon the specific application.

Figure 2:
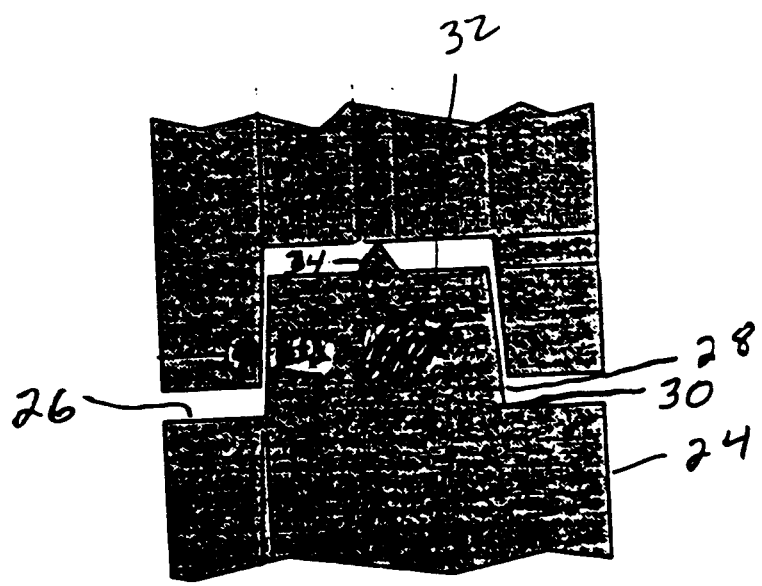
FIG. 2 is a cross-sectional view of the tongue and groove joint between the body and cap prior to ultrasonic welding.

Base 12 includes cylindrical body or wall 24 into which the various elements are inserted. The edge 26 of cylindrical body 24 includes longitudinally oriented circular tongue 28 (also see FIGS. 2 and 3). The cross section of tongue 28 prior to ultrasonic welding, as shown in FIG. 2, has a trapezoidal shape (which can likewise be square or rectangular) with a base 30 integral with cylindrical body 24. Base 30 is parallel to, but somewhat wider than upper edge 32 ("upper" referring to the orientation illustrated in FIG. 2) of circular tongue 28. Triangular point 34 is formed on upper edge 32 forming a variable degree energy director.

Figure 4:
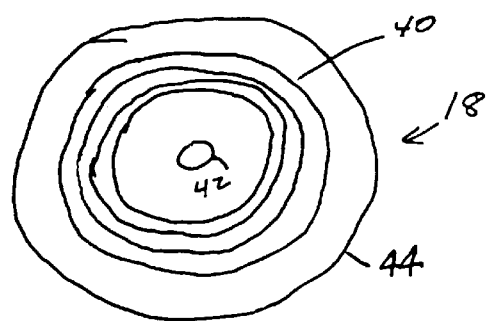
FIG. 4 is a plan view of the underside of the cap, showing e configuration of the groove used in the tongue-and-groove joint of the present invention.

As shown in FIG. 4, cap 18 is disk-shaped and includes circular groove 40 inwardly adjacent from edge 44. Cap 18 further includes central aperture 42 which engages O-ring 16 (or similar seal) through which rotor 14 passes and rotates therein (see FIG. 1). Circular groove 40 has a trapezoidal cross-section (or square or rectangular) which is complementary to the trapezoidal (or square or rectangular) portion of tongue 28. Circular groove 40 typically has a minimum 0.55 millimeter opening with a minimum 0.5 millimeter wall thickness as measured from the outer section of circular groove 40 to the edge 44 of cap 18, or from the inner section of circular groove 40 to the wall of aperture 42.

Of course, circular tongue 28 and circular groove 40 could be reversed so that circular tongue 28 is on cap 18 and circular groove 40 is on edge 26 of cylindrical body 24.

Figure 5B:
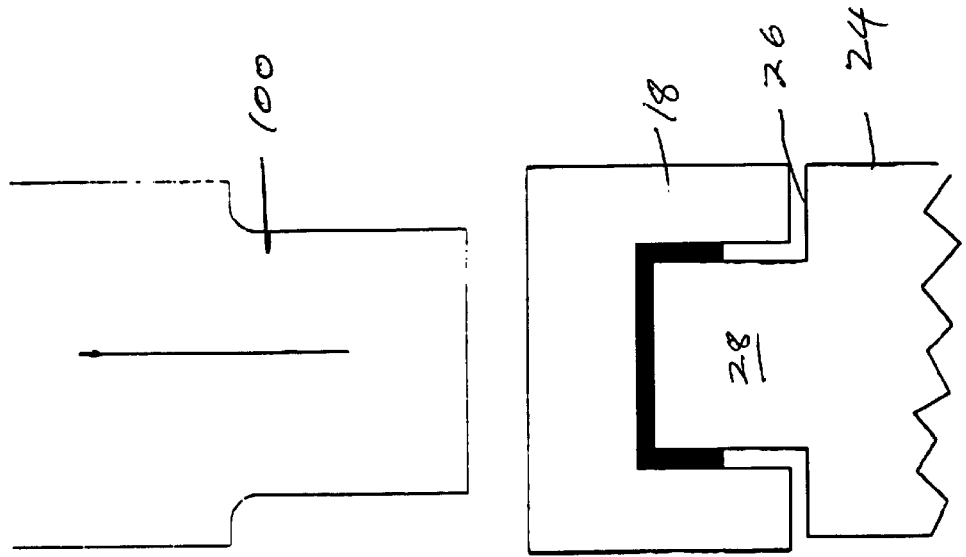
FIG. 5b is a cross-sectional view illustrating the horn of the ultrasonic welding tool against the cap after the ultrasonic weld is formed.
Figure 5A:
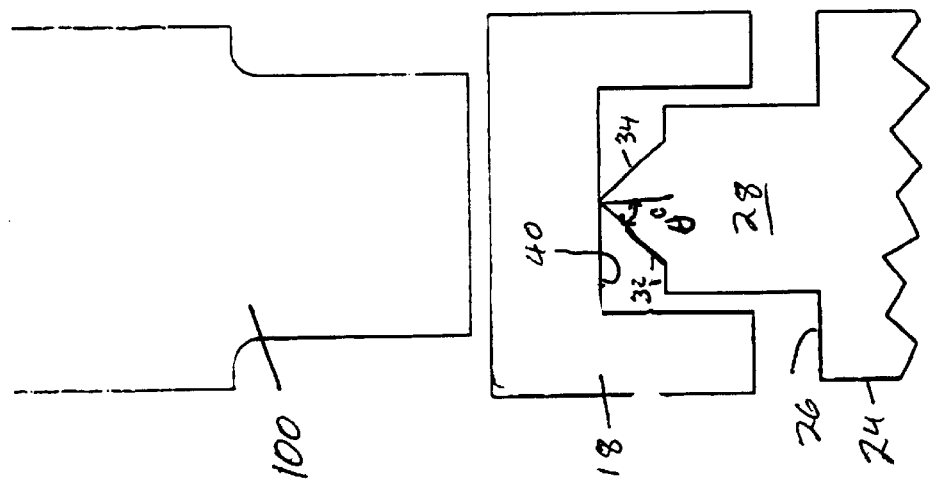
FIG. 5a is a cross-sectional view illustrating the horn of the ultrasonic welding tool against the cap before the ultrasonic weld is formed.
Figure 3:
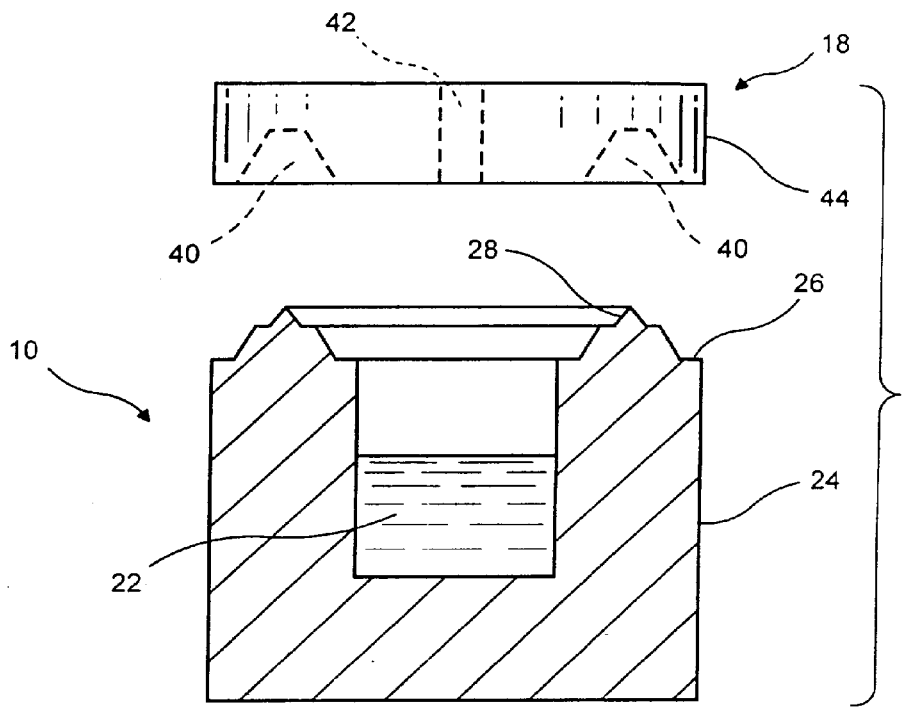
Figure 4:
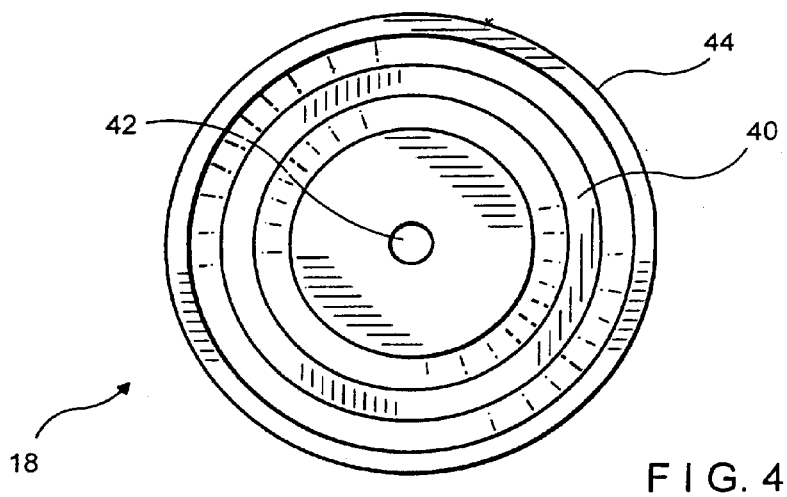
Figure 5B:
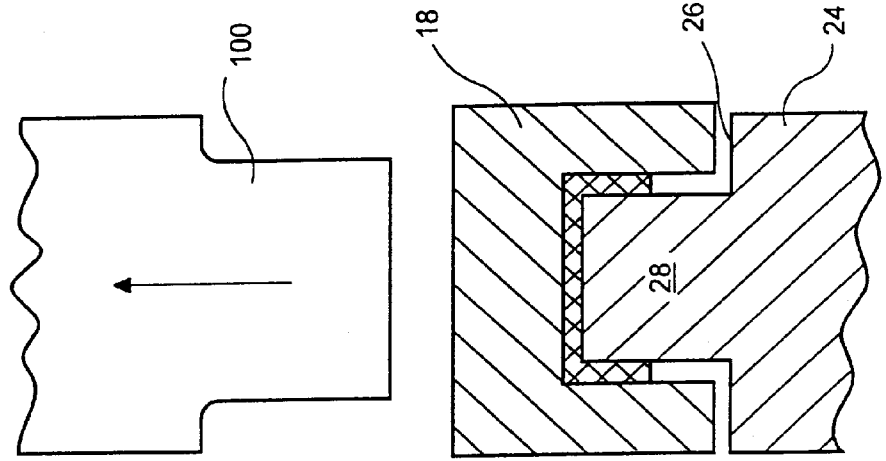
Figure 5A:
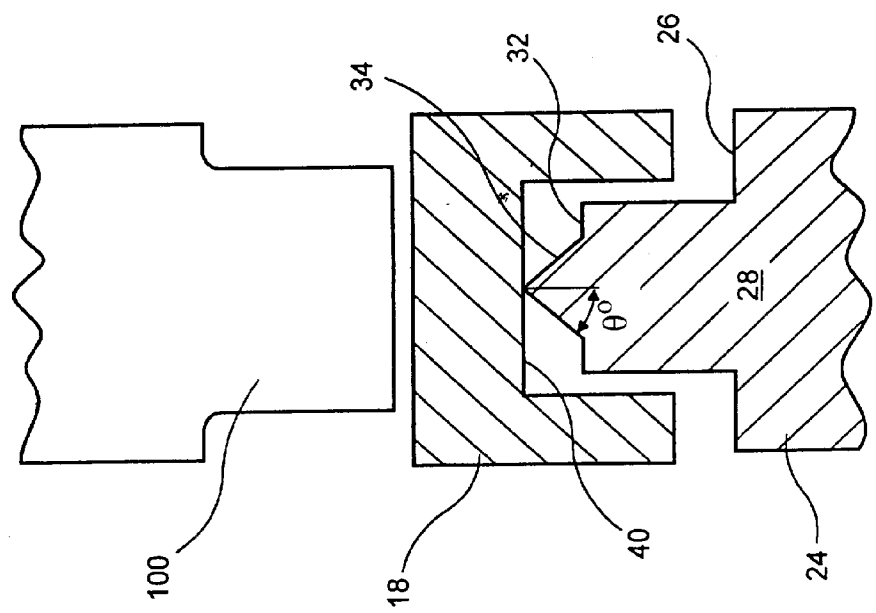

Assembly of damper 10 typically includes placing silicone or other damping media 22 into cylindrical body 24 of base 12. The rotor 14, O-ring 16, cap 18, and gear 20 (optional) are assembled as required by the particular configuration. Cap 18 is then placed against edge 26 of cylindrical body 24 so that circular tongue 28 is placed within circular groove 40 as shown in FIG. 2. Horn of ultrasonic welding tool 100, as shown in FIGS. 5a and 5b, forms the ultrasonic weld between cylindrical body 24 and cap 18. The resulting configuration eliminates potential for cap flexing thereby creating a repeatable hermetic weld and consistent torque. Similarly, the resulting configuration properly encapsulates the weld thereby eliminating strings and creating a superior weld.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

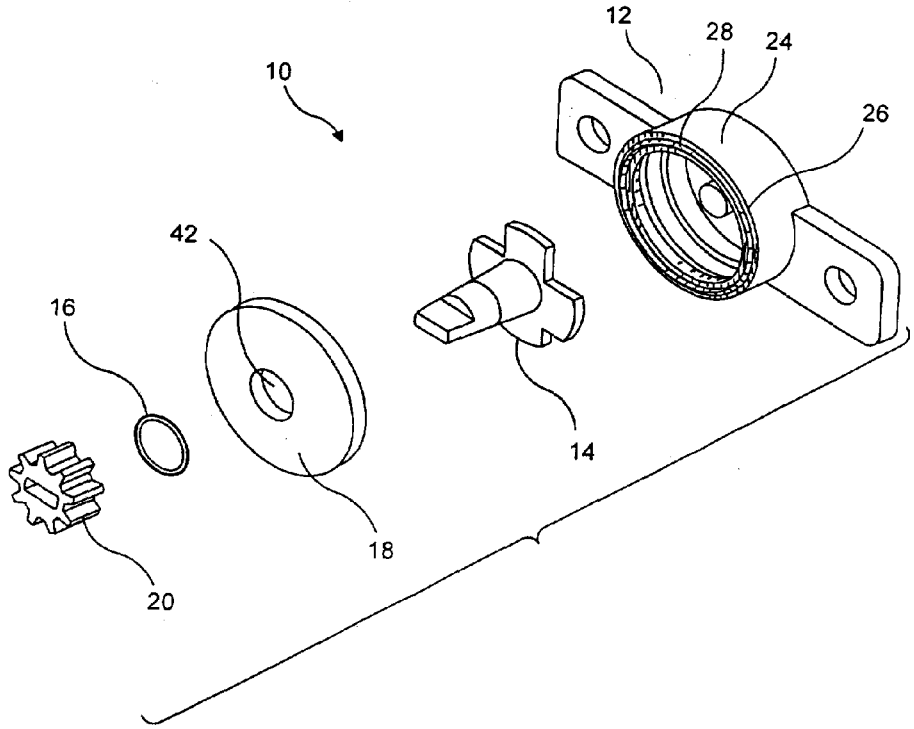

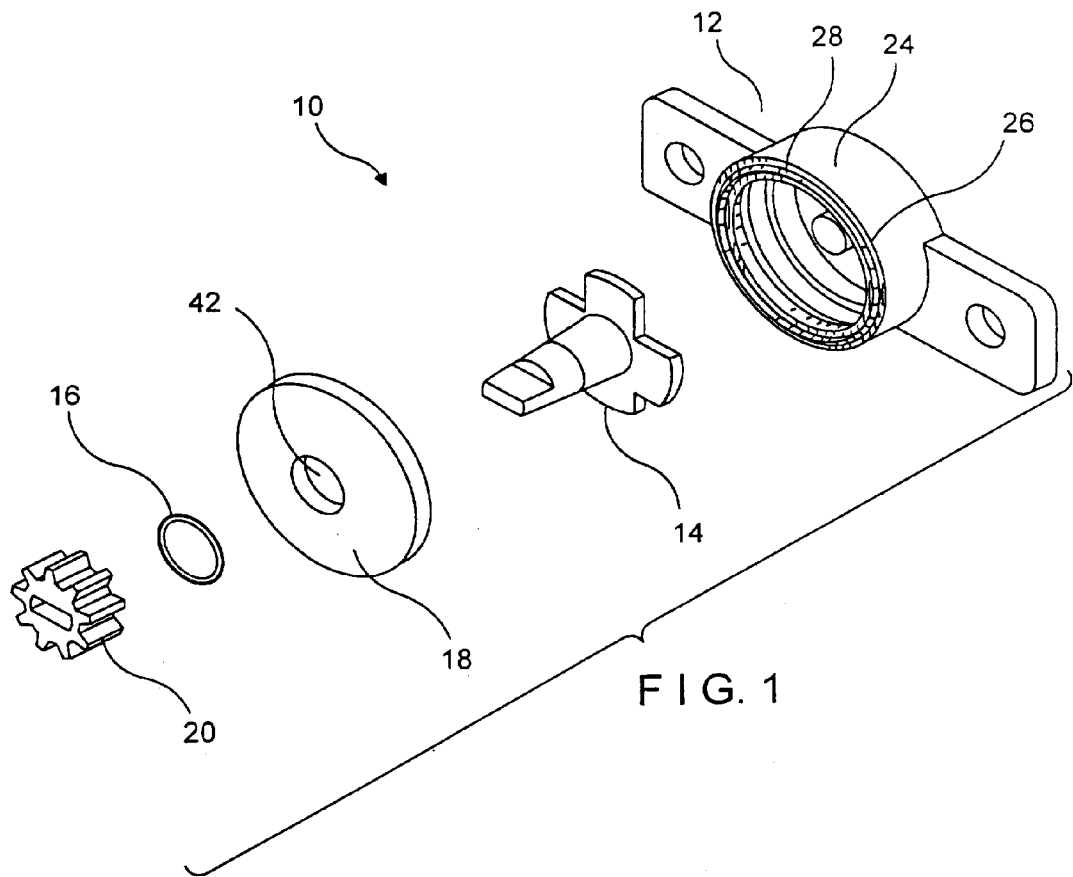
FIG. 1
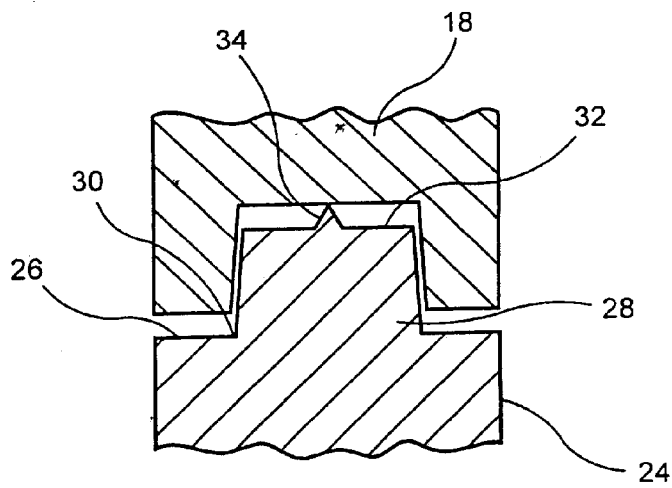

What is claimed is:

1. A damper including:

a housing formed by a wall, said wall including an edge;

a cap;

a first of said cap and said edge including a tongue element of a tongue and groove configuration, and a second of said cap and said edge including a groove element of said tongue and groove configuration, wherein said tongue element is inserted into said groove element and ultrasonically welded, said cap engaging said edge to form a relatively closed space.

2. The damper of claim 1 wherein said cap includes a central aperture, the damper further including a rotary element within said relatively closed space, further including a shaft extending through said central aperture.

3. The damper of claim 2 wherein said relatively closed space includes damping media.

4. The damper of claim 3 wherein said damping media is silicone.

5. The damper of claim 2 wherein said wall is cylindrical, said edge is circular, and said cap is circular.

6. The damper of claim 5 wherein said tongue element and said groove element are circular.

7. The damper of claim 6 wherein said tongue element has a trapezoidal, rectangular or square cross-sectional portion and said groove element has a cross-sectional portion complementary to said trapezoidal, rectangular or square cross-sectional portion.

8. The damper of claim 7 wherein said tongue element further includes a triangular cross-sectional portion on an edge of said trapezoidal cross-sectional portion.

9. The damper of claim 8 further including a seal in said central aperture, said shaft passing through said seal.

10. The damper of claim 9 further including a gear attached to said shaft outside of said relatively closed space.

11. The damper of claim 10 wherein said groove element has at least a 0.55 millimeter opening with at a least 0.50 millimeter wall thickness adjacent thereto.

\* \* \* \* \*

UNITED STATES PATENT AND TRADEMARK OFFICE
CERTIFICATE OF CORRECTION

PATENT NO.    : 6,298,960 B1
DATED         : October 9, 2001
INVENTOR(S)   : Calvin Derr It is certified that error appears in the above-identified patent and that said Letters Patent is hereby corrected as shown below:

<u>Title page,</u>
The title page should be deleted and substitute therefor the attached title page.

<u>Drawings,</u>
Delete drawings sheets 1-3, and substitute therefor the drawing sheets, consisting of figures 1-5, as shown in the attached pages.

Signed and Sealed this

Eighteenth Day of June, 2002

*Attest:*

*Attesting Officer*

JAMES E. ROGAN
*Director of the United States Patent and Trademark Office*

United States Patent
Derr

(10) Patent No.: US 6,298,960 B1
(45) Date of Patent: Oct. 9, 2001

(54) SMALL VISCOUS PRECISION DAMPER

(75) Inventor: Calvin Derr, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/580,859

(22) Filed: May 30, 2000

(51) Int. Cl.[7] .................................. F16F 9/12; F16D 57/00
(52) U.S. Cl. .................................. 188/290; 188/322.5
(58) Field of Search ........................ 188/290, 292, 188/291, 322.5, 130; 16/51, 53, 54, 82, DIG. 10, DIG. 9; 74/574, 572, 573 F; 4/236; 192/58.4

(56) References Cited

U.S. PATENT DOCUMENTS

| | | | |
|---|---|---|---|
| 4,527,675 | * | 7/1985 | Omata et al. .................. 188/290 |
| 4,571,773 | * | 2/1986 | Yuda ............................... 188/290 |
| 4,614,004 | | 9/1986 | Oshida . |
| 4,638,528 | * | 1/1987 | Omata et al. . |
| 4,691,811 | * | 9/1987 | Arakawa et al. ............... 188/290 |
| 4,701,229 | * | 10/1987 | Arakawa et al. . |
| 4,796,733 | * | 1/1989 | Nakayama ...................... 188/290 |
| 4,830,151 | * | 5/1989 | Numata ............................ 188/290 |
| 4,833,938 | * | 5/1989 | Reinwall et al. ............... 74/574 |
| 4,840,083 | * | 6/1989 | Hagan et al. .................. 74/574 |
| 4,869,125 | * | 9/1989 | Saigura ........................... 188/290 |
| 4,893,522 | * | 1/1990 | Arakawa ......................... 188/290 |
| 5,211,267 | * | 5/1993 | Clark ............................... 188/290 |
| 5,269,397 | * | 12/1993 | Kawamoto et al. ........... 188/290 |
| 5,301,775 | * | 4/1994 | Nedbal et al. ................. 188/290 |
| 5,718,309 | * | 2/1998 | Kariya ............................. 188/290 |

* cited by examiner

Primary Examiner—Douglas C. Butler
(74) Attorney, Agent, or Firm—Pitney, Hardin, Kipp & Szuch LLP

(57) ABSTRACT

The viscous damper is formed with a body with a cylindrical wall presenting an edge with a circular tongue element thereon. A cap with a corresponding circular groove element is placed thereon so that the tongue and groove elements align with each other. The resulting tongue and groove configuration is ultrasonically welded thereby forming a hermetic seal. This particularly results in a very precise damper height which is important for small or miniature dampers.

11 Claims, 3 Drawing Sheets